(12) United States Patent
Miller

(10) Patent No.: US 7,227,813 B2
(45) Date of Patent: Jun. 5, 2007

(54) METHOD AND APPARATUS FOR FORMING MULTIPLE BEAMS

(75) Inventor: Christopher X. Miller, Audubon, PA (US)

(73) Assignee: AllezPhysionix, Ltd, Seattle, WA (US)

( * ) Notice: Subject to any disclaimer, the term of this patent is extended or adjusted under 35 U.S.C. 154(b) by 555 days.

(21) Appl. No.: 10/800,125

(22) Filed: Mar. 12, 2004

(65) Prior Publication Data

US 2005/0004464 A1 Jan. 6, 2005

Related U.S. Application Data

(60) Provisional application No. 60/454,959, filed on Mar. 14, 2003.

(51) Int. Cl.
*A61B 8/00* (2006.01)
(52) U.S. Cl. .................. 367/123; 600/443; 600/447
(58) Field of Classification Search ............... 600/447, 600/443; 367/103, 119, 123
See application file for complete search history.

(56) References Cited

U.S. PATENT DOCUMENTS

| | | | |
|---|---|---|---|
| 5,148,810 A | 9/1992 | Maslak et al. |
| 5,261,408 A | 11/1993 | Maslak et al. |
| 5,291,892 A | 3/1994 | O'Donnell |
| 5,409,010 A | 4/1995 | Beach et al. |
| 5,546,807 A | 8/1996 | Oxaal et al. |
| 5,623,930 A | 4/1997 | Wright et al. |
| 5,701,898 A | 12/1997 | Adam et al. |
| 5,808,962 A | 9/1998 | Steinberg et al. |
| 5,840,033 A | 11/1998 | Takeuchi |
| 5,911,692 A | 6/1999 | Hussain et al. |
| 5,922,962 A | 7/1999 | Israk et al. |
| 5,928,151 A | 7/1999 | Hossack et al. |
| 5,971,927 A | 10/1999 | Mine |
| 6,066,096 A | 5/2000 | Smith et al. |
| 6,135,971 A | 10/2000 | Hutchinson et al. |
| 6,148,095 A | 11/2000 | Prause et al. |

(Continued)

OTHER PUBLICATIONS

"A novel amplitude-phase weighting for analog microwave beamforming" Farzaneh, S. Sebak, A.-R. Dept. of Electr. & Comput. Eng., Concordia Univ., Montreal, Que., Canada Antennas and Propagation, IEEE Transactions on Publication Date: Jul. 2006, vol. 54, Issue: 7, pp. 1997-2008.*

*Primary Examiner*—Ian J. Lobo
(74) *Attorney, Agent, or Firm*—Ann W. Speckman; Speckman Law Group PLLC

(57) ABSTRACT

An apparatus and associated method are disclosed which form a multiple beam forming network using time division multiplexing. Instead of having several parallel sets of beam forming network hardware running at a given sampling clock rate, a simpler, single piece of hardware is run at a faster rate equal to the given sampling clock rate times the number of beams to be formed. Each sample received from each element is time division multiplexed into a bit stream, one for each beam. These time division multiplex element samples are weighted to apply the desired phase shift/time delay per element. Each weighted resultant is delayed in a cascade delay pipeline and then combined with the cascade combiner to form a beam at a given time division instant. This process is repeated for the next set of time division multiplexed samples and weights from each element of the array at a given time to form the next beam. The process is repeated for all beams until the sampling time interval ends.

26 Claims, 11 Drawing Sheets

U.S. PATENT DOCUMENTS

| | | |
|---|---|---|
| 6,188,373 B1 * | 2/2001 | Martek .................. 342/375 |
| 6,238,346 B1 | 5/2001 | Mason |
| 6,524,253 B1 | 2/2003 | Abend |
| 6,682,483 B1 | 1/2004 | Abend |
| 7,090,642 B2 * | 8/2006 | Satoh .................. 600/447 |

* cited by examiner

102

| Element x, Beam 1, Range 1, Weight |
| Element x, Beam 2, Range 1, Weight |
| Element x, Beam 3, Range 1, Weight |
| ⋮ |
| Element x, Beam N, Range 1, Weight |

⋮

| Element x, Beam 1, Range R, Weight |
| Element x, Beam 2, Range R, Weight |
| Element x, Beam 3, Range R, Weight |
| ⋮ |
| Element x, Beam N, Range R, Weight |

FIG. 9

METHOD AND APPARATUS FOR FORMING MULTIPLE BEAMS

CROSS-REFERENCE TO RELATED APPLICATION

This application claims the benefit of U.S. Provisional Application Ser. No. 60/454,959 filed Mar. 14, 2003.

FIELD OF THE INVENTION

The present invention relates to beam forming, and more particularly, to forming multiple beams using time division multiplexing.

BACKGROUND OF THE INVENTION

Several techniques exist for locating an object using wave propagation. In the fields of sonar, radar, ultrasound, and telecommunications, transmitting/receiving elements are placed in an array. Some or all of the elements of the array emit pulses of electromagnetic radiation or sound toward a target, and reflections from the target are received at all of the elements. Since the received signals arrive at different times at each element, if the signals are summed at a given time, then some signals will be in phase and some will be out of phase. The summation will be less than the maximum amplitude possible. To receive the maximum amplitude possible, the received signals from all the elements are focused into a beam.

A beam is amplitude or power as a function of angle (position). Beam forming is a linear operation on the signals received from the array of elements, combining them with delays (weights). The first element will be delayed a certain amount of time/phase, the second element a different amount of time/phase, etc., so that all peaks will line up at the same phase. One technique of weighting elements is to represent each received signal as a complex phasor with a real and imaginary (quadrature) component. The complex representation of the received signal is multiplied (weighted) by a complex weight which shifts the phase of the received waveform by the desired amount of delay.

An example of an application of beam forming is given in U.S. Pat. No. 6,682,483 to Abent et al. ("Abend"), which is incorporated by reference herein. In Abend, multiple piezoelectric transducers are placed on the head of a patient, and the acoustical energy is used to map blood flow in three dimensions. The point in the vessel with the greatest blood flow is pinpointed and tracked by forming a beam from the multiple piezoelectric elements. In Abend, multiple beams are calculated, requiring a different set of weights for each beam.

One reason for calculating multiple beams is to map a given volume at various points, one beam for each point. Another reason for calculating multiple beams is to reduce the number of elements necessary to gain an accurate picture of a position from several antenna/transducer elements.

The technique in the prior art for forming multiple beams is shown in FIG. 1 of the present application. The received reflected signal from each element is first sampled for a period of time and digitized (not shown) via analog-to-digital converters (A/D converters) 10a through 10m, one for each of the elements 1 through M. Each of the outputs of the A/D converters is fed to separate, parallel beam forming networks 12a through 12n, one for each of the N beams to be formed. Within each beam forming network, each A/D converter output is fed to beam forming weighting networks 14a through 14m, and then a beam combining network 16. Having a separate beam forming network for each beam is costly in terms of hardware needed, and it does not scale with requirements (it may not be possible to add more hardware to a circuit board).

SUMMARY OF THE INVENTION

The limitations of prior art beam formers are addressed by the present invention, which includes a system for forming a plurality of beams from a reflected signal received by a transducer array having first and second receiver elements, each of said first and second receiver elements receiving the reflected signal at a phase dependent upon the position of the first receiver element relative to the second. The received signal at each of the first and second receiver elements is sampled and converted to a digital signal by first and second associated analog-to-digital converters at a sampling rate defining a time interval during which a first value representing the amplitude of the received signal at the first receiver element and a second value representing the amplitude of the received signal at the second receiver are available during the time interval. The system includes a time division multiplexer for sequentially applying first and second weighting factors to the first value to generate first and second resultants for forming first and second beams, respectively. The time division multiplexer sequentially applies third and fourth weighting factors to the second value to generate third and fourth resultants for forming the first and second beams. A combiner combines the first and third resultants and the second and fourth resultants for forming the first and second beams, respectively.

In accordance with a method of the invention, a plurality of beams is formed from a reflected signal received by a transducer array having first and second receiver elements. Each of the first and second receiver elements receive the reflected signal at a phase dependent upon the position of the first receiver element relative to the second, the received signal at each of the first and second receiver elements being sampled and converted to a digital signal by first and second associated analog-to-digital converters at a sampling rate defining a time interval during which a first value representing the amplitude of the received signal at the first receiver element and a second value representing the amplitude of the received signal at the second receiver are available during the time interval. A first weighting factor is applied to the first value during a first portion of the time interval to generate a first resultant for a first beam for the first receiver element. A second weighting factor is applied to the first value during a second portion of the time interval, generating a second resultant for a second beam for the first receiver element. A third weighting factor is applied to the second value during a third portion of the time interval to generate a third resultant for a first beam for the second receiver element. A fourth weighing factor is applied to the second value during a fourth portion of the time interval, generating a fourth resultant for a second beam for the second receiver element. The first and third resultants are combined to generate the first beam; and the second and fourth resultants are combined to generate the second beam.

Further features and advantages of the invention will appear more clearly on a reading of the following detailed description of two exemplary embodiments of the invention, which are given below by way of example only with reference to the accompanying drawings.

BRIEF DESCRIPTION OF THE DRAWINGS

For a more complete understanding of the present invention, reference is made to the following detailed description of two exemplary embodiments considered in conjunction with the accompanying drawings, in which:

FIG. 9 depicts the layout of the second embodiment of a weighting memory when there are R depths of focus;

DETAILED DESCRIPTION OF THE INVENTION

The present invention reduces the part count and cost of the prior art beam forming networks by replacing the separate parallel networks with a single network, which uses time division multiplexing. Instead of having several parallel sets of beam forming network hardware running at a given sampling clock rate, a simpler single piece of hardware is run at a faster rate equal to the given sampling clock rate times the number of beams to be formed. Each sample received from each element is time division multiplexed into a bit stream, one for each beam. These time division multiplex element samples are weighted to apply the desired phase shift/time delay per element. Each weighted resultant is delayed in a cascade delay pipeline and then combined with a cascade combiner to form a beam at a given time division instant. This process is repeated for the next set of time division multiplexed samples and weights from each element of the array at a given time to form the next beam. The process is repeated for all beams until the sampling time interval ends.

This technique of and apparatus for forming multiple beams for locating an object using wave propagation are applicable to many fields such as sonar, radar, ultrasound, and telecommunications.

Figure 2A:
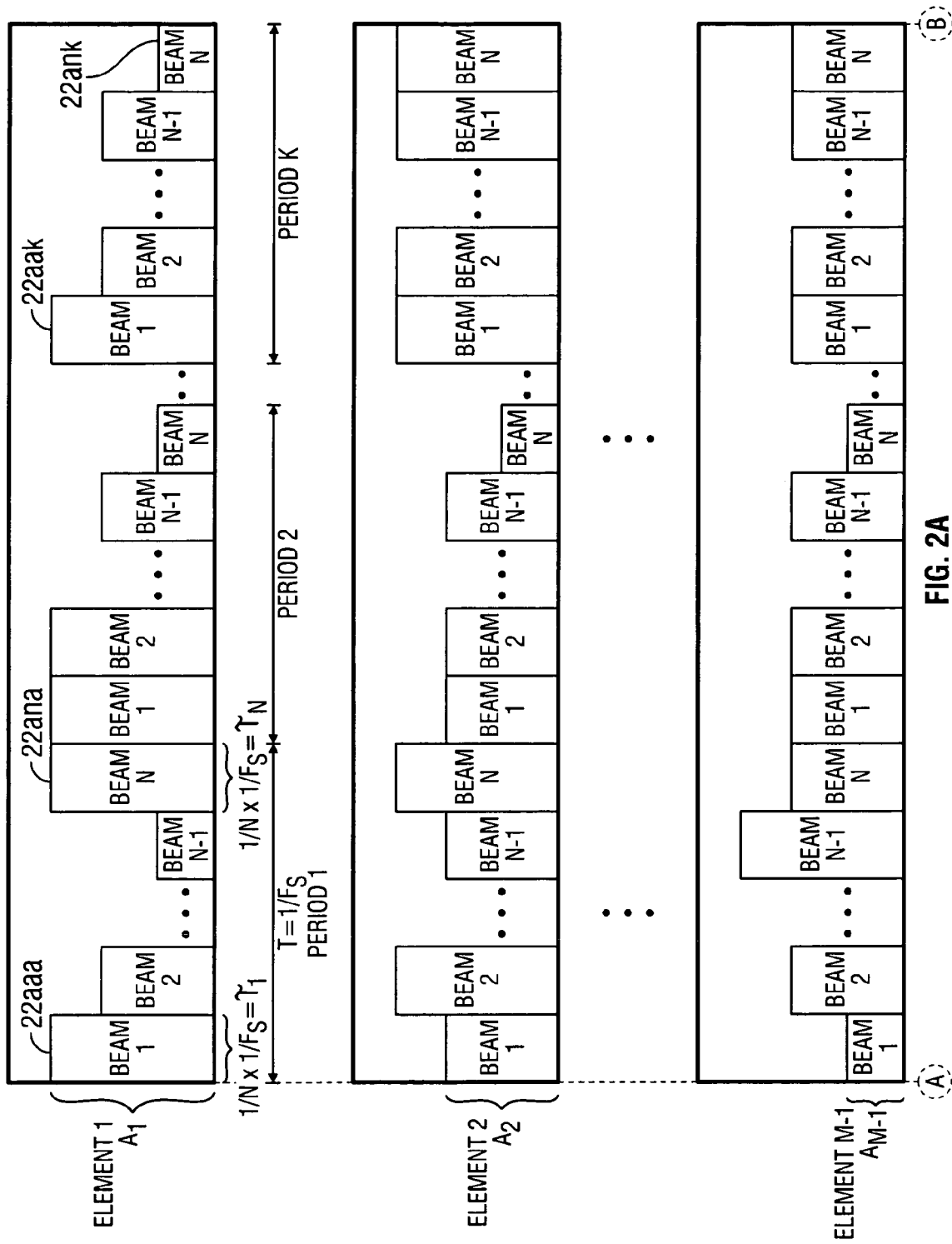
FIGS. 2A and 2B depict a time flow diagram of time division multiplexed beam forming of the present invention, with FIG. 2B being a continuation of FIG. 2A, as shown.
Figure 2B:
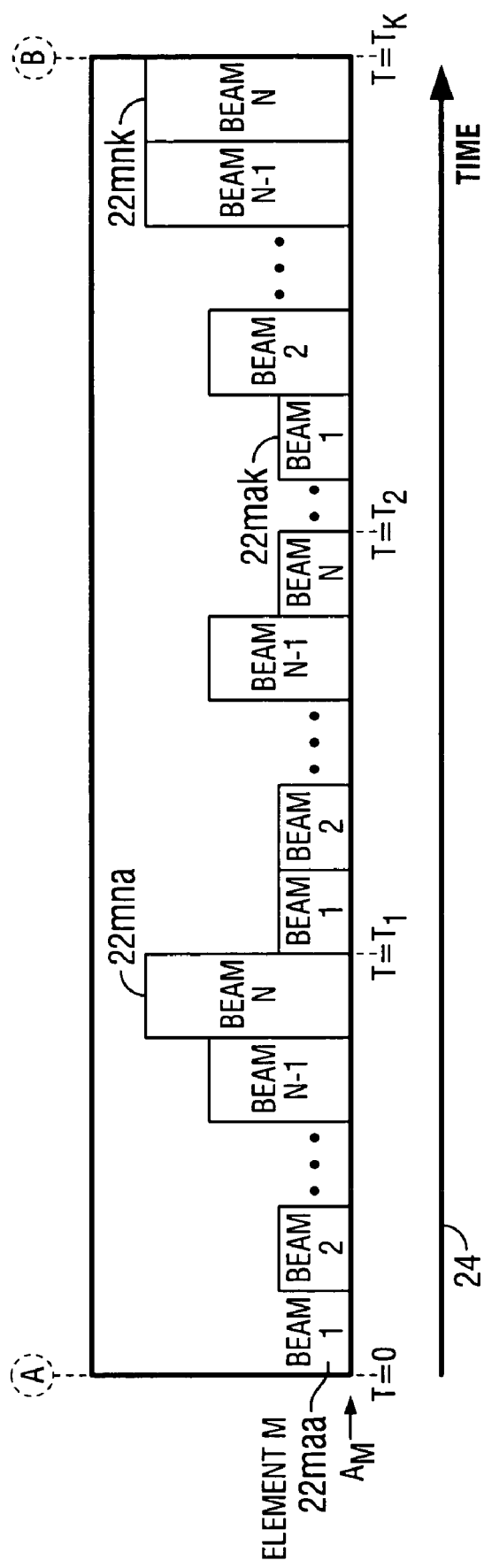

With regard to FIG. 2, a time flow diagram of a time division multiplexed beam forming network of the present invention is depicted. The array of M elements (outputs of A/D converters from antennas/transducers) to be sampled is depicted along vertical axis 20. For each element from 1 through M, the incoming transduced signal is sampled for a time period T seconds=1/Fs where Fs is the sampling frequency in Hertz. The horizontal axis 24 represents the flow of time. A total of k sampling periods are depicted along the horizontal axis, where k extends indefinitely into the future. The first sampling period begins at t=0 and ends at t=$T_1$, the second begins at t=$T_1$ and ends at t=$T_2$, and the kth time period begins at t=$T_k$−T and ends at t=$T_k$. In the prior art, N parallel networks consisting of the same beam forming hardware would be sampling the signals from each element for the entire length of time interval T for k time intervals to generate N beams.

Figure 1:
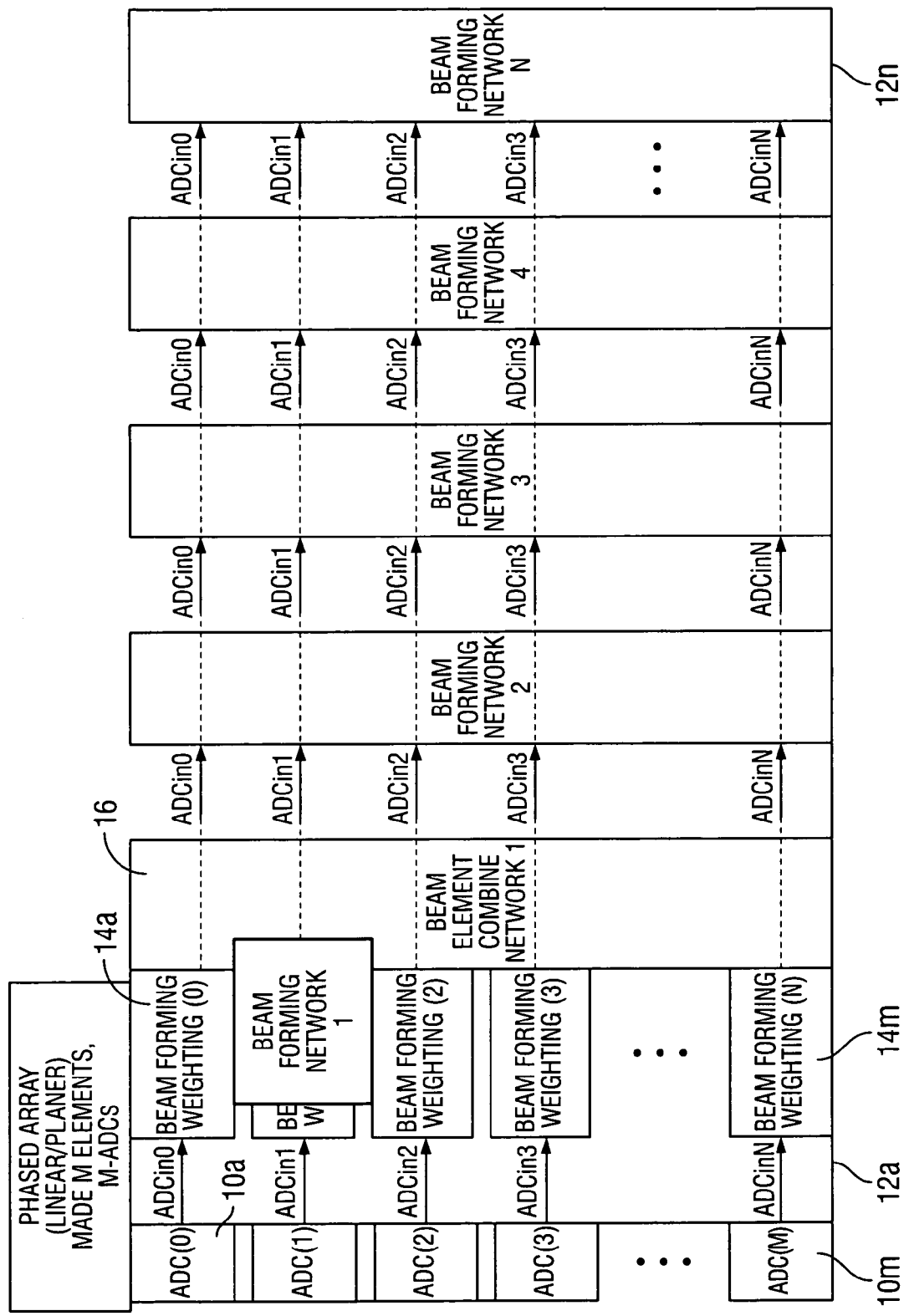
FIG. 1 depicts parallel beam forming networks of the prior art.

In the illustrative embodiment of the present invention, the sampling period T is further divided into N time intervals of length 1/N*1/Fs seconds=τ(tau). The first period, $\tau_1$=1/N*1/Fs seconds, is devoted to Beam 1 where the sample for constructing Beam 1 at Element 1 is represented by the magnitude at reference 22*aaa*. For Beam N, Element 1, the sample magnitude is referenced by 22*ana* for sampling period $\tau_N$. Moving along vertical axis 20, we see that at 22*maa*, the Mth element for beam 1 is sampled by the beam forming hardware, while at 22*mna*, the Mth element is sampled for the Nth beam. Likewise for time period k, 22*aak* represents the sample devoted to Beam 1 for Element 1; 22*ank*, Beam N, Element 1. 22*mak* represents Beam 1, Element M at the beginning of time interval k, while 22*mnk* represents Beam N, Element M at the last time interval in period k Looking along vertical axis 20 during $T_1$ of time period 1, the beam forming hardware of the present invention takes each of the samples from each of the elements and "weights" (e.g., complex multiplies) each sample magnitude (amplitude, power, etc.) Ai by a weight wi, and then combines (e.g. sums) each weighted-sample to form a coherent beam, e.g. Beam 1 (using 22*aaa*, 22*aba*, . . . , 22*ama*). The method used for selecting the weights is known in the prior art. This process is repeated for Beam 2 through N during time period 1, and then again for time periods 2 through k, and so on. Thus, N beams are reconstructed for each time period of the sampling hardware. The beam forming hardware runs at a faster sampling rate N*Fs Hertz to form N beams in time. To increase the number of beams, one need only run the beam forming hardware at a rate proportional to the number of beams desired, instead of adding more hardware as required by the prior art systems described above in FIG. 1.

Figure 3:
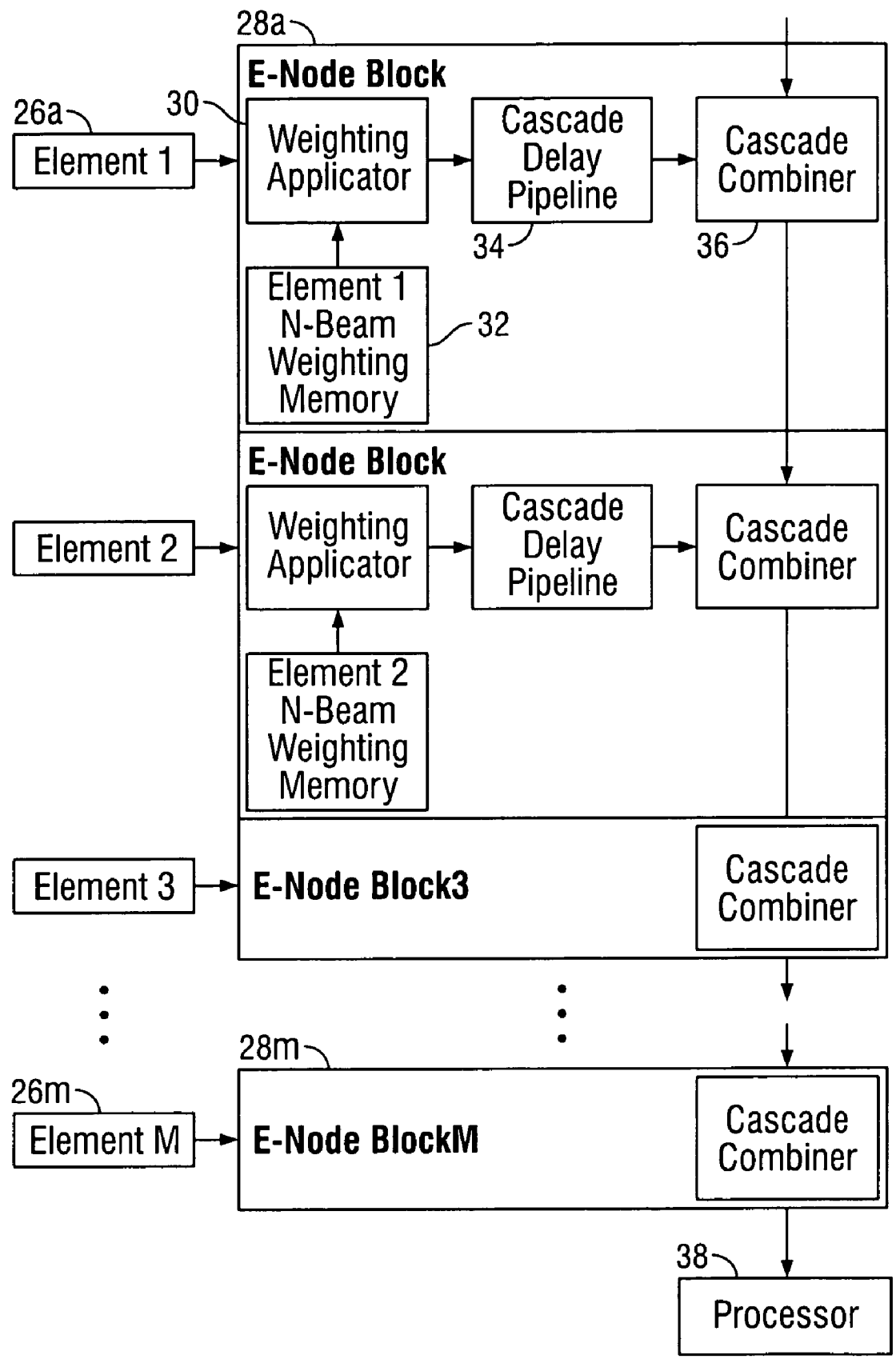
FIG. 3 depicts a block diagram of an exemplary embodiment of the present invention.

With regard to FIG. 3, a block diagram of an exemplary embodiment of the present invention is depicted. This technique replaces the separate beam forming networks of the prior art described above in FIG. 1 with simpler blocks 28*a* through 28*m* of repeated design, one per element 26*a* through 26*m* of the M element, called E-nodes. Groups of E-node blocks 28*a* through 28*m* can be implemented in an ASIC (application specific integrated circuit), FPGA (field programmable gate array), or even in a digital signal processor algorithm.

Each of E-node blocks 28*a* through 28*m* is composed of a weighting applicator 30, a weighting memory 32, cascade delay pipeline 34, and cascade combiner 36. The components of E-Node block 28*a* are running at N*Fs Hz where Fs is the element 26*a* sampling rate and N is the number of beams to be formed. Weighting memory 32 is cycled through N weights per element sampling period T seconds to create N weighted resultants, one for each of the N beams, with the weighting applicator 30. The process of combining or summing each of the these resultants from the M element samples per beam is accomplished by cascading the resultants from each E-Node block through cascade delay pipeline 34 and cascade combiner 36. The final N beams are presented to processor 38 for post processing algorithms and display.

Figure 4:
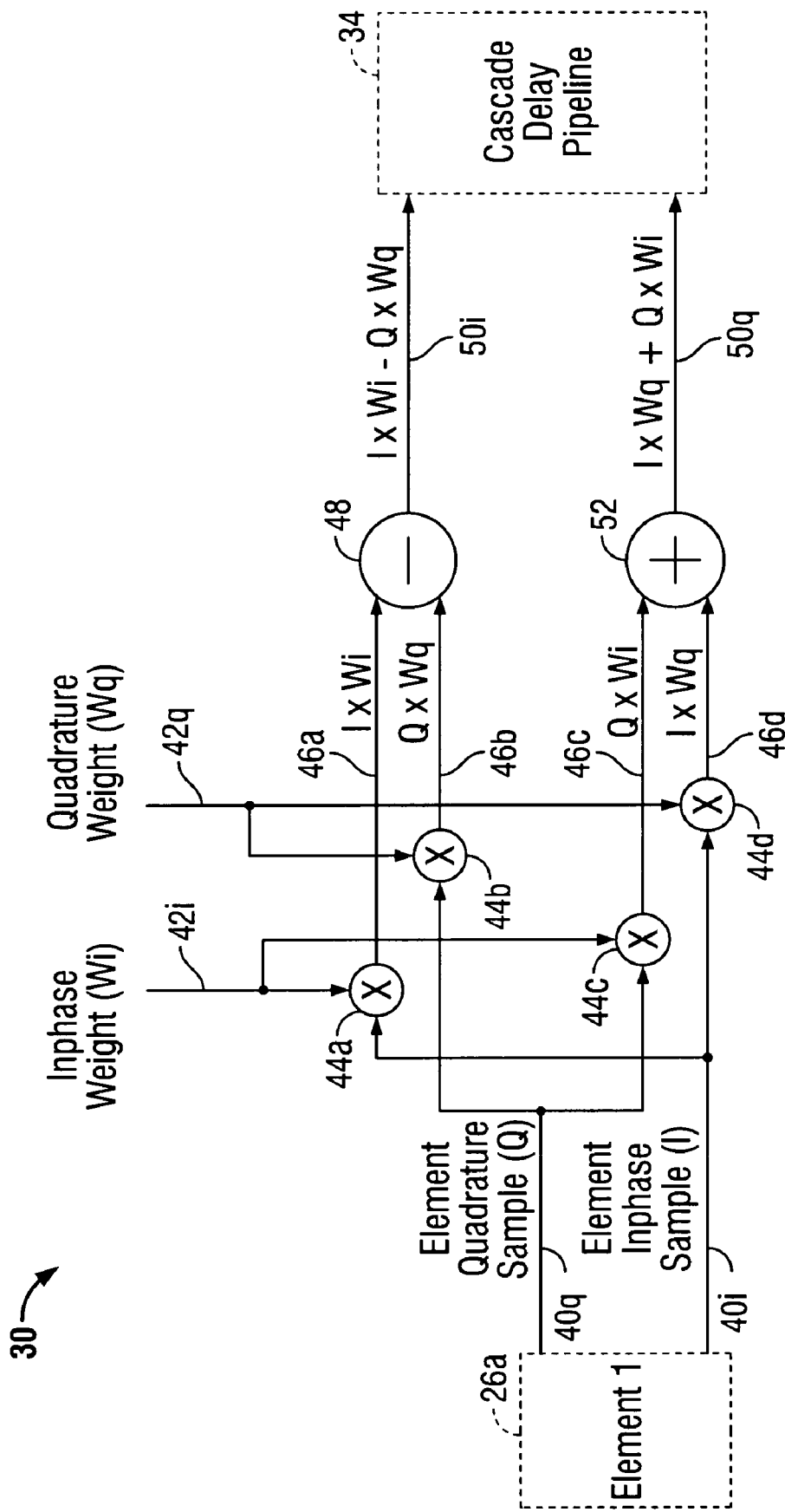
FIG. 4 depicts a first embodiment of a weighting applicator which is shown as blocks in FIG. 3.
Figure 5:
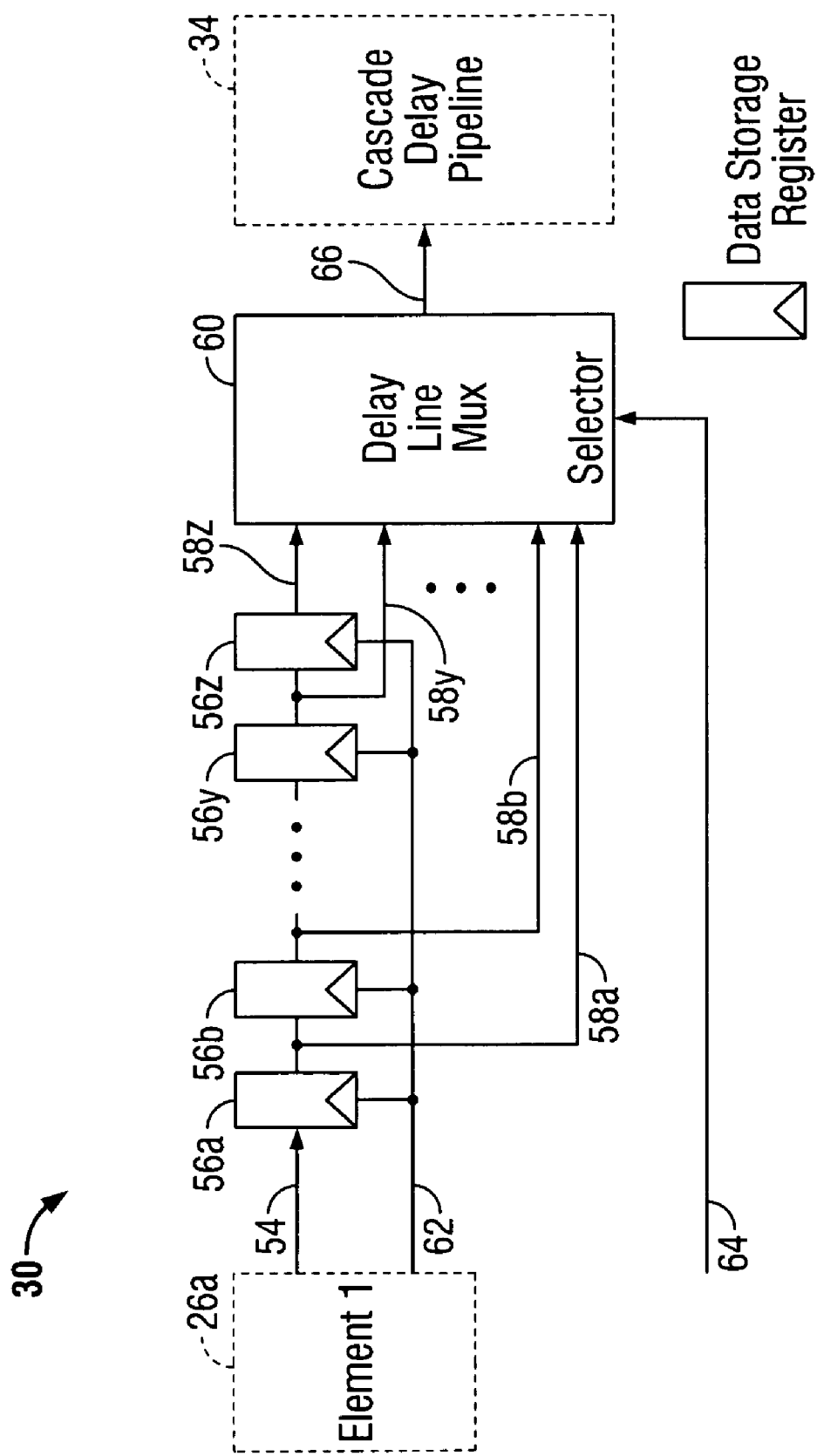
FIG. 5 depicts a second embodiment of a weighting applicator which is shown as blocks in FIG. 3.

Note that FIG. 4 shows a weighting applicator utilizing complex inputs and outputs, including in-phase and quadrature components, going to and coming from sub-blocks 26*a*, 30, 34, and 36 of FIGS. 3, 6, 8, 10, and 11, while FIG. 5 shows only one input/output passing between blocks 26a, 30, 34, and 36. The single input/outputs of sub-blocks as depicted in FIGS. 3, 6, 8, 10, and 11 represent either the one or two input/output architectures.

With regard to FIG. 4, a first embodiment weighting applicator 30 is depicted. In this embodiment, complex phasor multiplication is used to achieve the required phase shift for aligning each received signal sample, e.g., from element 26a. The received sample from element 26a contains a real (in-phase) component I appearing at complex weighting multiplier input 40i, and imaginary (quadrature) component Q appearing at complex weighting multiplier input 40q. The weight loaded from weighting memory 32 has in-phase component Wi appearing at complex weighting multiplier input 42i, and imaginary (quadrature) component Wq appearing at complex weighting multiplier input 42q. Input 40i is fed to multipliers 44a and 44d; input 40q is fed to multipliers 44b and 44c; input 42q is fed to multipliers 44b and 44d, and input 42i is fed to multipliers 44a and 44c. Multiplier 44a produces intermediate result 46a; multiplier 44b produces intermediate result 46b; multiplier 44c produces intermediate result 46c; and multiplier 44d produces intermediate result 46d. Two of these intermediate results 46a and 46b are subtracted at difference element 48 producing real output 50i, while intermediate results 46c and 46d are added in summing element 52 to produce imaginary (quadrature) output 50r. Outputs 50i and 50r are fed to output sample cascade delay pipeline 34.

The operations performed by the complex weighting multiplier 30 of FIG. 4 are complex multiplication of complex sample input (I+jQ) by complex weighting input (Wi+jWq) as shown in Equation 1 below:

$$(I+jQ)(Wi+jWq)=(IWi-QWq)+j(IWq+QWi) \qquad (1)$$

With regard to FIG. 5, a second embodiment of weighting applicator 30 is depicted. Instead of multiplying complex phasors as in FIG. 4, a delay is used to align components of a beam. The received sample from e.g., element 26a, is fed into element sample input 54 of weighting applicator 30. Sample input 54 passes sequentially through a series of storage registers 56a through 56z (as shown by shifts to the right), whose outputs 58a through 58z are fed to delay line mux (multiplexer) selector 60. Each shift through the storage registers 56a through 56z imparts a certain amount of delay to sample input 54. Storage registers 56a through 56z are clocked by input sample clock input 62 at a rate equal to the input sampling frequency. One of outputs 58a through 58z, which is selected by delay line mux selector 60 via selector input 64, represents the total delay desired to line up a signal sample, e.g. from element 26a, to a desired phase (depending on the beam to be selected, the particular element sampled, and the depth of focus desired). Weighting factor wi stored in weight memory 32 may be translated (not shown) to the value to be placed on selector input 64. The selector input 64 is clocked at the input sampling frequency times the number of beams. The output 66 of mux selector 60 is fed to output sample cascade delay pipeline 34.

Figure 6:
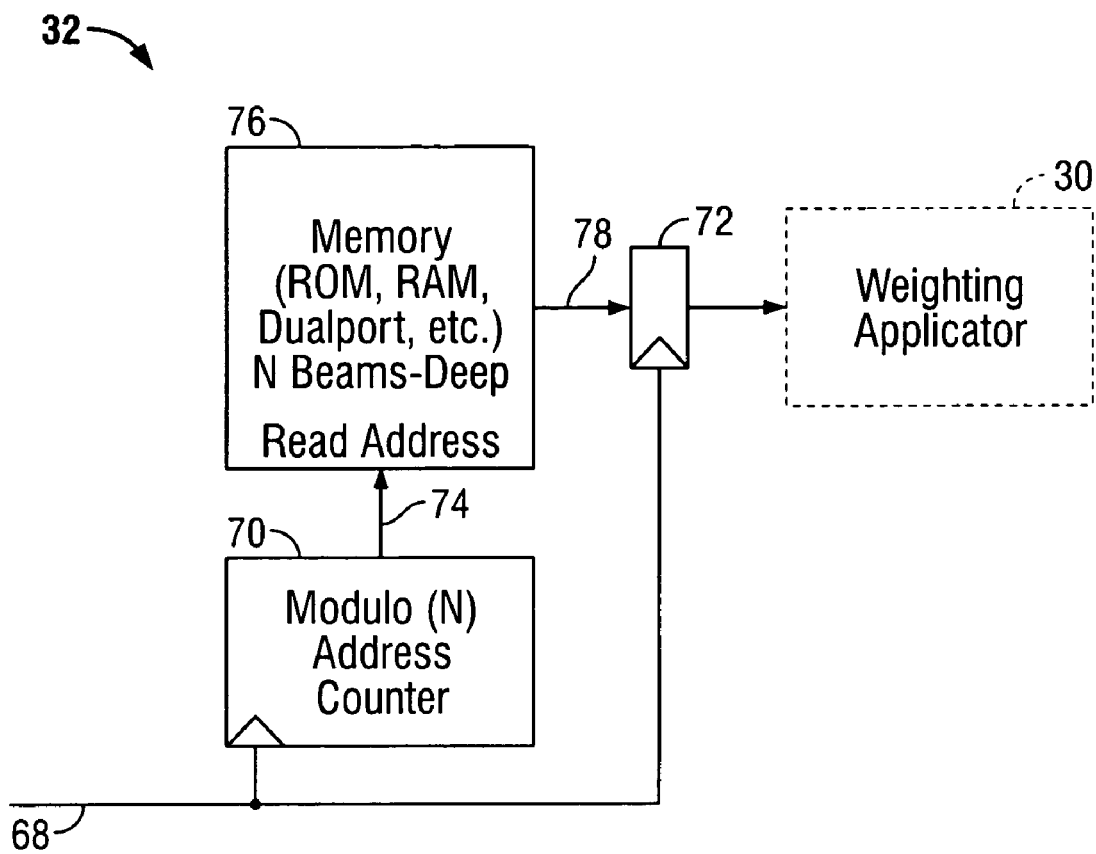
FIG. 6 depicts a first embodiment of a weighting memory when there is only one constant depth of focus.

With regard to FIG. 6, a first embodiment of the weighting memory 32 is depicted when there is only one constant depth of focus. Sample clock input 68 is fed to the inputs of Modulo (N) Address Counter 70 and storage register 72, where N is the number of beams. Modulo (N) Address Counter 70 generates and applies read address 74 to Memory 76, which can be ROM, RAM, Dual Port RAM, etc. The weight addressed by read address 70 is latched into storage register 72 via memory output 78. The output of storage register 72 is fed to weighting applicator 30.

Figure 7:
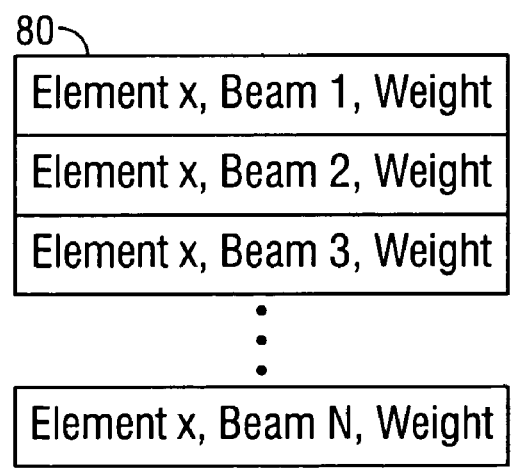
FIG. 7 depicts the layout of the first embodiment of a weighting memory when there is only one depth of focus.

With regard to FIG. 7, the layout of the first embodiment of the weighting memory 32 when there is only one depth of focus is depicted. When there is only one constant depth of focus, each weight 80 is stored sequentially based on beam number for each element (M), for a total of M samples times N beams worth of weight data and repeated each sample period.

Figure 8:
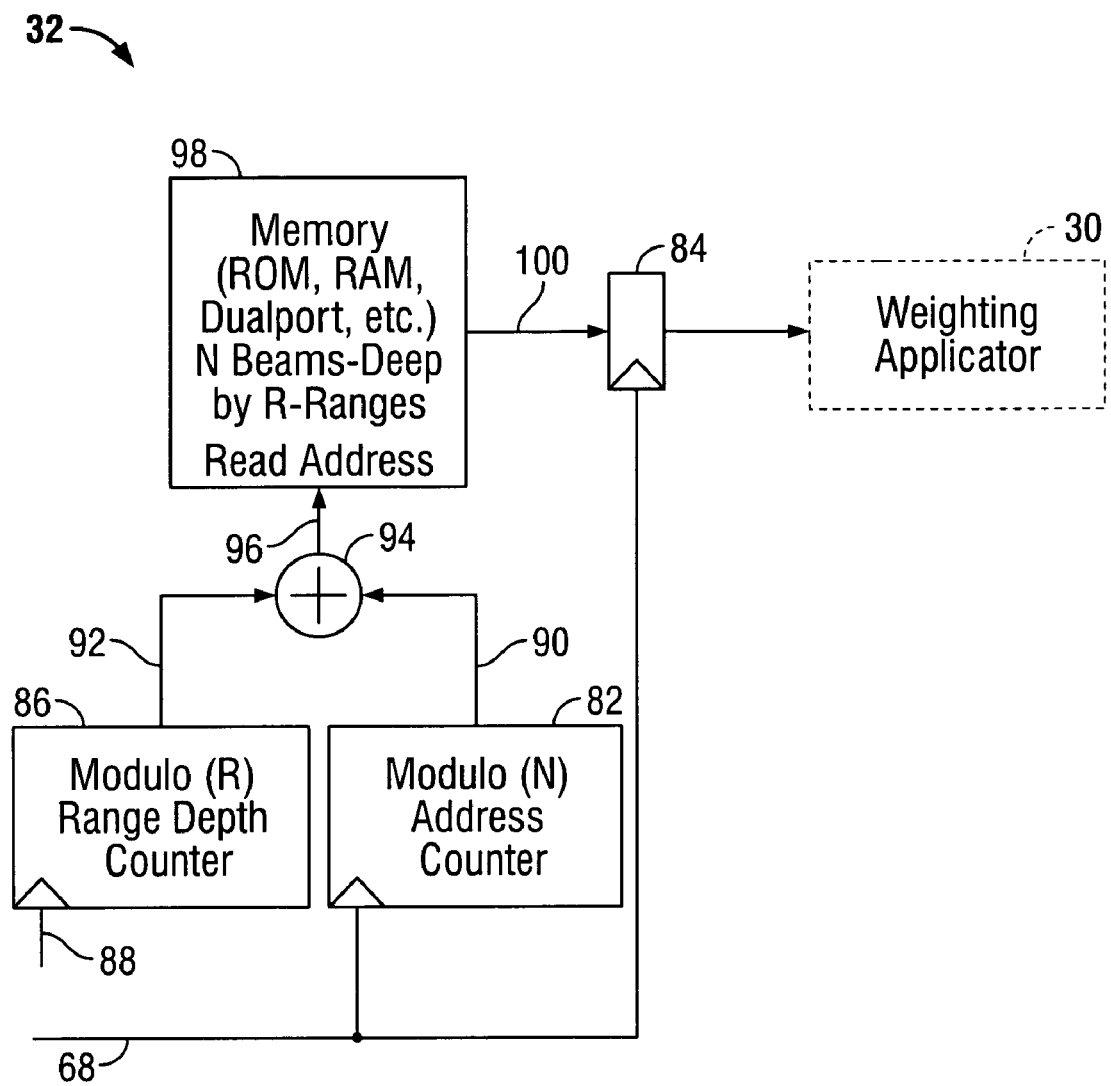
FIG. 8 depicts a second embodiment of a weighting memory when there are R depths of focus.

With regard to FIG. 8, a second embodiment of the weighting memory 32 is depicted when there are R depths of focus. Sample clock input 68 is fed to the inputs of Modulo (N) Address Counter 82 and storage register 84, where N is the number of beams. In addition to Modulo (N) Address Counter 82, there is also a Modulo (R) Range Depth Counter 86, with its own Range Focus Depth Enable clock input 88. The output 90 of Modulo (N) Address Counter 82 and the output 92 of Modulo (R) Range Depth Counter 86 are combined in node 94 to provide a read address 96 to Memory 98. Memory 98 can be ROM, RAM, Dual Port RAM, etc. The weight addressed by read address 96 is latched into storage register 84 via memory output 100. The output of storage register 84 is fed to weighting applicator 30.

With regard to FIG. 9, the layout of the second embodiment of the weighting memory 32 when there are R depths of focus is depicted. When there are R depths of focus, each weight 102 is stored sequentially based on beam number and range focus. There are M separate weight memories, one per element. The memory requirements are such that the memory must have a dimension that is greater than or equal to the number of beams times the number of range focuses. The memory 32 dwells on a set of N beam weights for a set period of time called a depth of focus. The depth of focus period determines at what sample the beam weights change to the next set of N beam weights. After the depth of focus dwell is completed, the memory 32 address is updated to the next range of focus. This process repeats until all ranges of focus have been visited.

Figure 10:
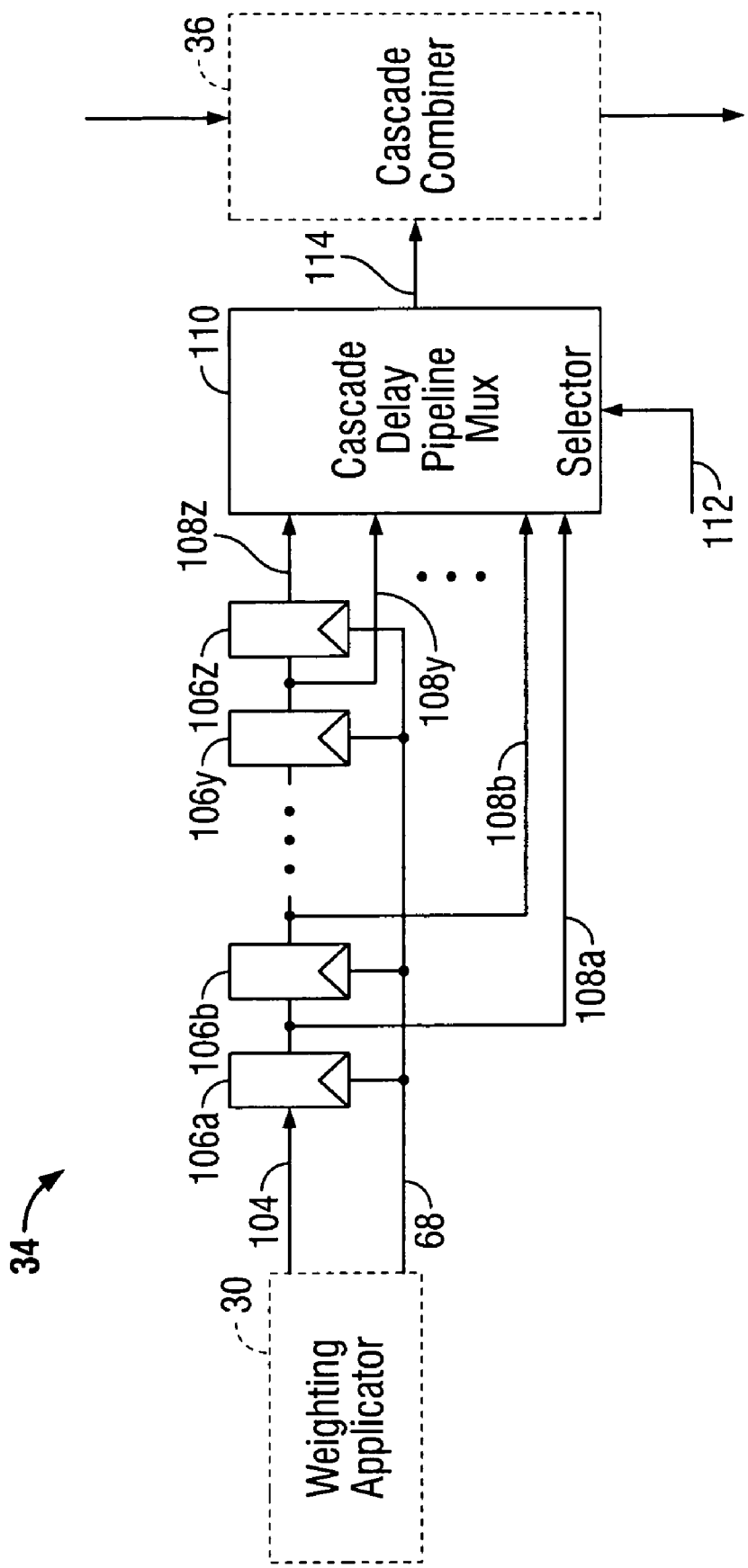
FIG. 10 depicts a block diagram of a cascade delay pipeline.

With regard to FIG. 10, a block diagram of cascade delay pipeline 34 is depicted. The output of weighting applicator 30 is fed to input 104 of cascade delay pipeline 34. Input 104 passes through a series of connected storage registers 106a through 106z, whose outputs 108a through 108z are fed to cascade delay pipeline mux 110. Each shift of data through storage registers 106a through 106z imparts a certain amount of delay to input 104. Storage registers 106a through 106z are clocked at input sample clock input 68 at a rate equal to the sampling frequency times the number of beams. One of outputs 108a through 108z is selected by cascade delay pipeline mux 110 via selector input 112. The output is selected relative to the E-Node block/sample in the summing tree. Early E-node blocks have less delay. Later E-Node blocks require more delay for proper time alignment between E-nodes. The delay imparted is hardware dependent, and is not related to the sampled signal itself. The output 114 of mux 110 is fed to cascade combiner 36.

Figure 11:
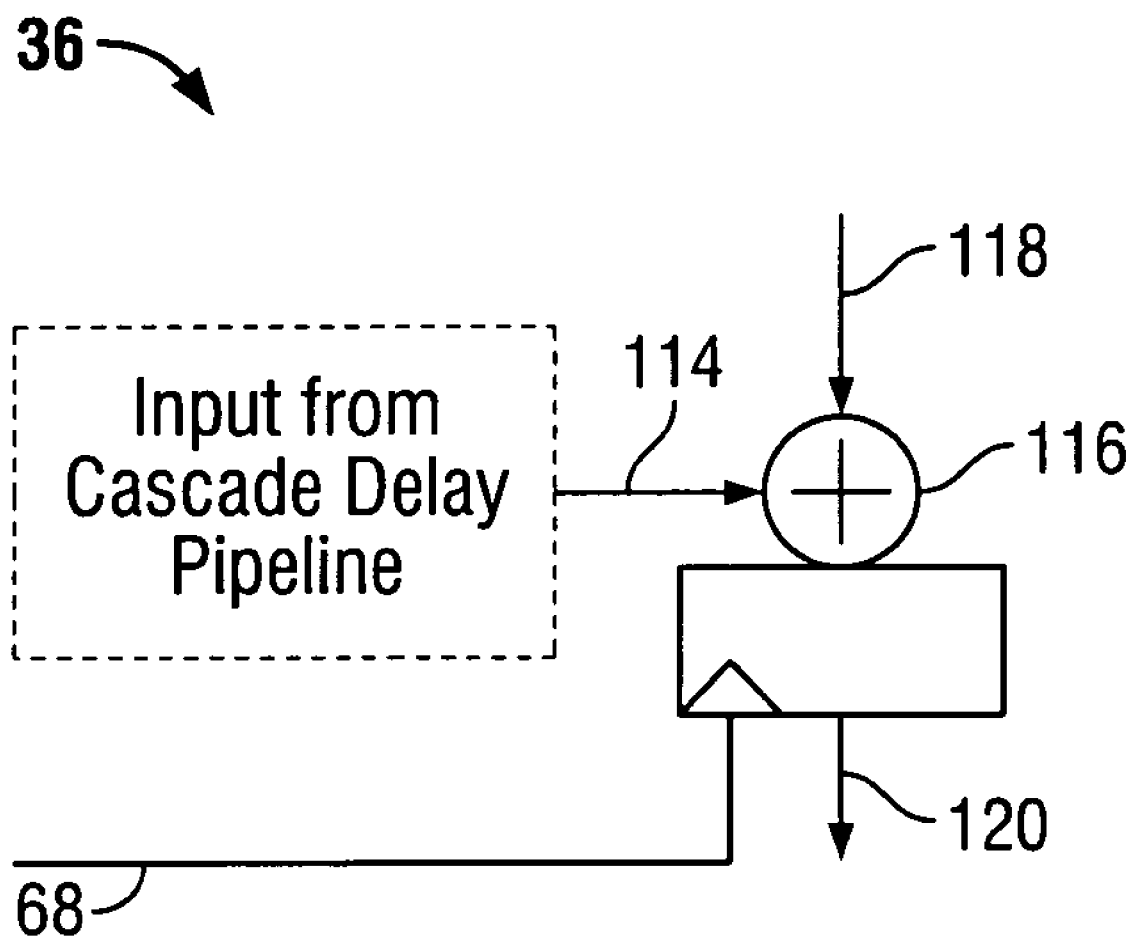
FIG. 11 depicts a block diagram of a cascade combiner.

With regard to FIG. 11, a block diagram of cascade combiner 36 is depicted. Output 114 of cascade delay pipeline 34 is fed to summing node 116. Also fed to summing node 116 is the output of the cascade delay pipeline 118 of the previous E-node. Summing node 116 is clocked at the number of beams times the sample frequency at input 68. Output 120 of summing node 116 is fed to the cascade combiner sub-block of the next E-node block in the chain.

The design of FIGS. 2 through 11 scales up in many dimensions depending on the end requirements. If large arrays are used, then the beam forming network shall consist of multiple copies of the processing node engine 28a through 28m.

It will be understood that the embodiments described herein are merely exemplary and that a person skilled in the art may make many variations and modifications without departing from the spirit and scope of the invention. All such variations and modifications are intended to be included within the scope of the invention.

What is claimed is:

1. A method for forming a plurality of beams from a reflected signal received by a transducer array having first and second receiver elements, each of said first and second receiver elements receiving the reflected signal at a phase dependent upon the position of the first receiver element relative to the second, the received signal at each of the first and second receiver elements being sampled and converted to a digital signal by first and second associated analog-to-digital converters at a sampling rate defining a time interval during which a first value representing the amplitude of the received signal at the first receiver element and a second value representing the amplitude of the received signal at the second receiver are available during said time interval, comprising the steps of:
   (a) applying a first weighting factor to the first value during a first portion of the time interval to generate a first resultant for a first beam for the first receiver element;
   (b) applying a second weighting factor to the first value during a second portion of the time interval to generate a second resultant for a second beam for the first receiver element;
   (c) applying a third weighting factor to the second value during a third portion of the time interval to generate a third resultant for a first beam for the second receiver element;
   (d) applying a fourth weighing factor to the second value during a fourth portion of the time interval to generate a fourth resultant for a second beam for the second receiver element;
   (e) combining the first and third resultants to generate the first beam; and
   (f) combining the second and fourth resultants to generate the second beam.

2. The method of claim 1, further including the step of repeating steps (a) though (f) in at least one subsequent time interval.

3. The method of claim 2, further comprising the step of changing at least one of the first, second, third and fourth weighting factors prior to said repeating steps (a) through (f).

4. The method of claim 1, wherein the first and third portions of the time interval overlap each other and the second and fourth portions of the time interval overlap each other.

5. The method of claim 4, wherein the first and third portions of the time interval and the second and fourth portions of the time interval coincide.

6. The method of claim 1, wherein the number N of beams generated is greater than 2.

7. The method of claim 6, wherein the number of receiving elements, M, is greater than 2, the received signal at each of the M receiving elements being sampled and converted to a digital signal by associated analog-to-digital converters, a plurality of weighting factors being sequentially applied to the digital signals to yield resultants, the resultants being combined into beams.

8. The method of claim 1, wherein said steps (a) through (d) include complex phasor multiplication to achieve the phase shift to form beams, the received sample and the weighting factors having an in-phase component and a quadrature component.

9. The method of claim 1, wherein said steps (a) though (d) include the step of multiplexing previously stored values of an analog-to-digital converter output from a plurality of connected registers, the contents of which are shifted to a subsequent connected register based upon a clock pulse, the register location of a value being dependent on how many clock pulses and how many shifts have occurred since the value was first presented to the first register of the plurality of registers and thereby related to a delay in time from when the value was first presented to the first register, said multiplexer selectively retrieving a particular value at a particular time from the plurality of registers to adjust the phase of the signal for forming a beam.

10. The method of claim 1, wherein said step (e) is the addition of the amplitudes of said first and said third resultants, and wherein said step (f) is the addition of the amplitudes of said second and said fourth resultants.

11. The method of claim 10, further including the step of retrieving weighting factors from a memory element, said retrieving step being performed prior to any of steps (a) through (d).

12. A system for forming a plurality of beams from a reflected signal received by a transducer array having first and second receiver elements, each of said first and second receiver elements receiving the reflected signal at a phase dependent upon the position of the first receiver element relative to the second, the received signal at each of the first and second receiver elements being sampled and converted to a digital signal by first and second associated analog-to-digital converters at a sampling rate defining a time interval during which a first value representing the amplitude of the received signal at the first receiver element and a second value representing the amplitude of the received signal at the second receiver is available during the time interval, comprising:
   (a) a time division multiplexer for sequentially applying first and second weighting factors to the first value to generate first and second resultants for forming first and second beams, respectively, said time division multiplexer sequentially applying third and fourth weighting factors to the second value to generate third and fourth resultants for forming the first and second beams, respectively; and
   (b) a combiner for combining the first and third resultants to form the first beam and the second and fourth resultants to form the second beam.

13. The system of claim 12, wherein said multiplexer includes a weighting applicator for applying a weighting factor to a value available at an output of an analog-to-digital converter, said weighting applicator having an input for receiving the output of the analog-to-digital converter and an output leading to said combiner.

14. The system of claim 13, wherein the output leading to said combiner includes in-phase and quadrature components.

15. The system of claim 13, wherein said combiner is a cascade combiner.

16. The system of claim 15, further comprising a cascade delay element interposed between said output of said weighting applicator and said cascade combiner.

17. The system of claim 16, wherein said delay element is a cascade delay pipeline.

18. The system of claim 16, further comprising a memory element for storing weighting factors to be applied by said weighting applicator.

19. The system of claim 18, further including a modulo (N) address counter and an addressable memory, the weighting factors being stored and retrieved from said addressable memory based upon a sequential and repeated count by the modulo (N) counter.

20. The system of claim 19, further comprising a modulo (R) counter, where R corresponds to the possible depth of focus values, said modulo (N) and modulo (R) counters, sequentially generating all ordered pairs of potential modulo (R) and modulo (N) values and addressing each weighting factor stored in said addressable memory at the address specified by each ordered pair.

21. The system of claim 12, wherein said multiplexer and said combiner are comprised of a plurality of node blocks, each node block receiving as an input said output of an analog-to-digital converter associated with a corresponding receiver element, said node blocks being connected serially such that the output of a first node block constitutes another input for a next node block.

22. The system of claim 21, wherein each of said node blocks includes a weighting applicator, a cascade delay, and a cascade combiner, with the output of the cascade combiner being the output of the node block and connected to an input of a cascade combiner of the next node block.

23. The system of claim 22, wherein said cascade delay synchronizes the output of said sequential receiver element outputs to allow the summing of said outputs as adjusted by said weighting applicator to form a beam.

24. The system of claim 23, wherein said weighting applicator utilizes complex phasor multiplication.

25. The system of claim 23, wherein said weighting applicator includes a series of registers through which time associated amplitude values are shifted upon receipt of a clock pulse, said weighting applicator including a multiplexer having inputs to each of said registers and capable of reading the value of any selected on of said and outputting that value as the output of said multiplexer.

26. The system of claim 12, further comprising a processor for interpreting and displaying beam data.

* * * * *